United States Patent Office 3,527,681
Patented Sept. 8, 1970

3,527,681

COPPER PLATING BATH AND A METHOD FOR DEPOSITING THICK COPPER FILMS THEREFROM

James M. Brownlow, Crompound, N.Y., assignor to International Business Machines Corporation, Armonk, N.Y., a corporation of New York

No Drawing. Filed June 17, 1968, Ser. No. 737,367
Int. Cl. C23b *5/20*
U.S. Cl. 204—52 4 Claims

ABSTRACT OF THE DISCLOSURE

An electrolytic plating bath for depositing thick copper films is disclosed. The bath contains water, a water soluble copper salt, to provide copper ions, a source of sulfate ions, a source of nitrate ions, formic acid and acetic acid. A critical limitation of the bath is that the ratio of sulfate ions to nitrate ions is maintained in a range of from about 0.52 to about 1.9. A method of depositing copper films from the above path in which the plating bath is flowed with a uniform velocity over the specified area to be plated with laminar agitation is also disclosed. The copper platings deposited from the bath and the method of this invention exhibit high conductivity, high ductility, uniform thickness, low internal stress, and does not blister on heating.

BACKGROUND OF THE INVENTION

Magnetic thin film devices commonly known as coupled-film devices, are increasingly gaining in importance in computer memory applications. Coupled films are so called because tiers of thin magnetic films are arranged so that the magnetic field of one film is coupled with that of another either through air by means of infringing magnetostatic fields or through common magnetic material. These devices are generally prepared by depositing a thin magnetic film, generally permalloy on insulated ground planes having a copper film thereon followed by the deposition of a thick copper film on the first magnetic film and subsequently depositing a second permalloy or magnetic film on the copper film. As the technology of preparing these devices advances, more attention is paid to the control of their magnetic properties in order to make these devices suitable for commercial use. Among the magnetic properties needing to be controlled are dispersion ($\alpha$), skew ($\beta$), coercivity ($H_0$) and the anisotropy field ($H_k$). It has been discovered that the above magnetic parameters are influenced by the method of the plating of magnetic films, for example, see co-pending applications Ser. No. 573,417 filed Aug. 18, 1966 to J. M. Brownlow and Ser. No. 601,951 to J. M. Brownlow and Harald Dahms, filed Dec. 15, 1966; both applications being commonly assigned to the IBM Corporation. In addition to the method of depositing magnetic films, it has also been found that the conducting surface upon which the magnetic film is deposited also plays an important role in determining the magnetic properties of the deposited magnetic films. For example, it has been found that the degree of orientation ($\alpha$), is closely dependent upon the texture of the conducting film as the coercivity of the magnetic films is likewise affected. Thus, in order to have optimum magnetic properties in a magnetic thin film device it is necessary to deposit a thick copper conducting layer in order to enhance its current carrying ability; it should have a smooth texture so as to provide a subsequently deposited magnetic film with a value of $\alpha$ of 1 degree or less, and should have a low internal stress so that on heating the magnetic film the copper film does not change dimensions, which has a consequence of producing great stress on magnetic films.

The prior art is replete with methods and baths for the electro-deposition of copper films, for example, several baths are taught in the following patents: Pat. No. 2,738,318; Pat. No. 3,293,109; Pat. No. 2,762,762; Pat. No. 3,220,897; Pat. No. 2,374,289; to name just a few of the many patents describing electrolytic copper plating baths. However, while the plating baths and methods disclosed in the prior art are suitable for the purpose intended therein, they have been found to be insufficient for depositing copper conducting films for the devices of this invention.

BRIEF DESCRIPTION OF THE INVENTION

According to one aspect of the invention, there is provided an electrolytic plating bath for depositing thick highly conductive copper films. The bath is comprised of water, a source of sulfate ions to produce sulfate ions in the range of about 0.21 to about 0.47 mole per liter, a water soluble copper salt to produce copper ions in the range of about 0.20 to about 0.36 mole per liter, a source of nitrate ions to produce nitrate in the range of about 0.22 to about 0.52 mole per liter, formic acid in the range of about 0.21 to about 0.62 mole per liter and acetic acid in the range of about 0.10 to about 0.32 mole per liter. Copper films deposited from the above bath have high conductivity, uniform thickness and exhibits low stress. Additionally, the films exhibit only minimum stress change on heat cycling.

According to another aspect of the invention there is provided a method for depositing copper films from the above bath. The method is characterized by flowing the bath over the area to be plated in a uniform velocity so as to maintain laminar agitating of the bath. The method of the invention provides copper films with controlled textures.

OBJECTS OF THE INVENTION

It is an object of the invention to provide an electrolytic plating bath for depositing copper films having high conductivity, with uniform thickness, and which does not stress a magnetic film deposited thereon on heat cycling.

Another object of the invention is to provide an electrolytic plating bath for depositing copper films which produce low dispersion in the permalloy films deposited thereon.

Still another object of the invention is to provide a method for controlling the texture of the plated copper film.

The foregoing and other objects, features and advantages of the invention would be apparent from the following more particular description of the preferred embodiment of the invention, as illustrated in the accompanying examples.

DESCRIPTION OF PREFERRED EMBODIMENTS

In the practice of the invention all reagents used are reagent grade. The source of sulfate ions may be any reagent grade metal sulfate salt, or sulfuric acid. For example, copper sulfate can be the source of both the sulfate ion as well as for cupric ions. As indicated above, copper sulfate may be the water soluble copper salt that is used for providing copper ions in solutions. Other water soluble copper salts may also be used such as copper nitrate which, in addition, provides nitrate ions which are essential to the bath. Similarly, nitric acid may be used as the source for nitrate ions when the copper salt is $CuSO_4$. The bath also contains acetic acid and formic acid which function as aids in surface leveling.

In preferred embodiments of this invention, sulfate ions, from whatever source, must be maintained in a range of from about 0.21 to about 0.47 mole per liter. The nitrate ions should be present in solution in the range from about 0.22 to about 0.52 mole per liter and a molar ratio between sulfate ion and nitrate ion in the range of from about 0.52 to about 1.9. Copper ions should be maintained in the bath in the range of from about 0.20 to about 0.36. In addition to the above constituents, there may be added a surfactant such as Triton X 100 or its equivalent, a surfactant made by Rohm and Haas Chemical Co., in the amount of about 0.4 to about 0.7 gm./liter.

It should be understood that the ranges given above for the constituents of the baths of this invention is deemed to be critical. When copper plating baths are prepared, in which the range of constituents fall without those given, the copper films produced thereby are found to be inadequate for the purposes intended. As part of the preparation of the coupled film magnetic device it is necessary to anneal the magnetic films at temperatures up to 200° C. for 30 minutes in an orienting magnetic field. The annealing step has as its purpose, the stabilizing of the easy magnetic axis in a preferred direction during the long term use of the device. Copper films prepared by baths in which the range of constituents fall without that of the present invention were found to change dimensionally or distort during the above mentioned annealing step, thereby inducing large stresses in the magnetic film. The induced stress gravely affects such magnetic properties as $H_0$ and $\alpha$.

In order that those skilled in the art may better understand how the present invention may be practiced, the following examples are given by way of illustration and not by way of limitation.

Example I

An electrolytic plating bath is prepared having the following proportions of constituents:

Water to make 1000 cc.
$H_2SO_4$—0.27 mole
Formic acid—0.42 mole
Acetic acid—0.16 mole
$Cu(No_3)_2 \cdot 3H_2O$—0.207 mole
Triton X 100—0.5 gms.
$SO_4^{=}:No_1^{-}$—1.3

A permalloy coated substrate is placed in a cell similar in design to that shown in above mentioned commonly assigned copending application Ser. No. 573,417. The above bath is filtered and flowed across the cell to avoid the surface growth of copper spikes on the permalloy surface. Care is taken to flow the bath over the surface being plated at a uniform velocity, as it has been found that the texture of ultimately plated film is dependent thereon. Agitation of the bath is controlled so as to insure a laminar flow of the bath of the plating surface, care being taken to avoid turbulent agitation which results in nonuniform texture of the plated copper film. The current density is maintained at about 40 to 50 ma./cm.$^2$. Plating is continued at room temperature for a time sufficient to obtain the desired thickness of copper e.g., 3 to 12 microns at a plating rate of about 8000 A./min. The plated thick copper films have grain sizes on the order of 300 A.

After the above plating operation, the copper plated structure is immersed in a compatible smoothing copper plating bath from which an additional thin copper film of small grain size, e.g., 100 A, is deposited. A suitable smoothing copper bath is the subject of co-pending patent application entitled "An Improved Electrolytic Plating Bath for Depositing a Smoothing Copper Film," by G. S. Alberts, J. M. Brownlow, and K. R. Grebe, filed as Ser. No. 737,350 on the same date as this application and is commonly assigned to IBM. A typical bath disclosed in the above mentioned co-pending application is comprised of sulfate ions in the range of about 0.60 to about 0.37 mole/liter; nitrate ions in the range of about 0.32 to about 0.40 mole liter; copper ions in the range of about 0.062 to about 0.132; a 1% gelatin solution in amounts of about 0.10 to 0.50 gram/liter and tartaric acid in the amount of about 0.007 to about 0.04 mole/liter. A surfactant can also be added in limited amounts. The sulfate ion sources may be obtained from $H_2SO_4$ or $CuSO_4 \cdot 5H_2O$ which can also be the cupric ion source. Nitrate ions are obtained from nitric acid or $$Cu(NO_3)_2 \cdot 3H_2O.$$

Plating of the smoothing copper layer is performed as above for the conducting layer until a film of about 3000 A. is deposited. The current density is maintained at about 30 to 40 ma./cm.$^2$.

At the completion of the copper plating operations the plated substrate is rinsed in distilled water, immersed in a permalloy plating bath and a second magnetic film is deposited thereon according to the methods disclosed in the commonly assigned copending patent applications Ser. Nos. 573,417 and 601,951 referred to above. In general the methods described in application Ser. Nos. 573,417 and 601,951 are related to pulse plating processes in which selective agitation between pulses is employed. The magnetic film is plated on the smoothing copper film in a diluted bath containing Ni and Fe or Ni, Fe and Cu. The plating current is one at which all these ions plate out on the substrate and the current is controlled to provide a series of current pulses through the bath and each pulse causes a magnetic layer to be plated. Typically, pulses are maintained at a duration of about 10 seconds. After each pulse, i.e., after the current is turned off the solution is agitated vigorously for 4 to 6 seconds. The current starts at about 11 ma./cm.$^2$ and decreases approximately geometrically to about 5.5 ma./cm.$^2$. Typical baths used in the above baths are as follows:

| | Low | High | Actual |
|---|---|---|---|
| Demineralized $H_2O$ (cc.) | 1,000 | 1,000 | 1,000 |
| Triton X-199 detergent (g.) | 0.2 | 0.6 | 0.6 |
| Saccharin, Na (g.) | 0.5 | 2.0 | 1.0 |
| Sulfamic acid (g.) | 0.5 | 5.0 | 1.0 |
| Sodium potassium tartrate (g.) | 5.0 | 10.0 | 7.5 |
| $NiSO_4 \cdot 6H_2O$ (g.) | 10.0 | 30.0 | 15.0 |
| $FeSO_4 \cdot 7H_2O$ (g.) | 1.0 | 8.0 | 2.25 |

| | Low | High | Preferred |
|---|---|---|---|
| Demineralized $H_2O$ (cc.) | 1,000 | 1,000 | 1,000 |
| Triton X-199 detergent (g.) | 0.2 | 0.6 | 0.6 |
| Saccharin, Na (g.) | 0.5 | 2.0 | 1.0 |
| Sulfamic acid (g.) | 0.5 | 5.0 | 1.0 |
| Sodium potassium tartrate (g.) | 5.0 | 10.0 | 7.5 |
| $NiSO_4 \cdot 6H_2O$ (g.) | 10.0 | 30.0 | 15.0 |
| $FeSO_4 \cdot 7H_2O$ (g.) | 1.0 | 8.0 | 1.75 |
| $CuSO_4 \cdot 5H_2O$ (g.) | 0.5 | 3.0 | 1.75 |

Etching of the plated coupled film device is next accomplished by standard techniques to provide control lines therein. The edges of the etched device is then plated with magnetic material for efficient flux closure. A method for edge plating the device is disclosed in commonly assigned copending application, Ser. No. 743,736 filed July 10, 1968 to G. S. Alberts and J. M. Brownlow, entitled "A Method of Edge Plating Coupled Film Devices."

The magnetic properties of the device are measured before and after annealing. Devices prepared from the above bath exhibited uniform magnetic properties. There was no indication of stress buildup in the permalloy-films. The magnetic films having a thickness of 1,000 A. had $H_0$ values of 4 or greater and $\alpha$ values of 1 or less.

Example 2

In another preferred embodiment of the invention a bath having the following composition is prepared:

Water to make 1000 cc.
$CuSO_4 \cdot 5H_2O$—0.29 mole
Formic acid—0.42 mole
Acetic acid—0.16 mole
$HNO_3$—0.45 mole
Triton X 100—0.5 g.
$SO_4^{=}:NO_3^{-}$—0.64 mole Plating was performed as above in Example 1. The plated films were found not to peel or appreciably change dimensionally. No stress was apparent in the magnetic films which exhibited excellent magnetic properties.

For the purpose of comparison, baths are prepared in which the constituents are present in amounts that are outside the upper and lower limits of the ranges required in the present invention. The following baths, disclosed in Examples 3 and 4 are exemplary of baths falling outside the desired range.

Example 3

Water to make 1000 cc.
$HNO_3$—0.45
Formic acid—0.42 mole
Acetic acid—0.16 mole
$Cu(NO_3)_2 \cdot 3H_2O$—0.11 mole
$CuSO_4 \cdot 5H_2O$—0.270 mole
Triton X 100—0.5 g.
$SO_4^{=}:NO_3^{-}$—0.40 mole Example 4

Water to make 1000 cc.
$H_2SO_4$—.540 mole
Formic acid—0.42 mole
Acetic acid—0.16 mole
$CuSO_4 \cdot 5H_2O$—0.180 mole
$Cu(NO_3)_2 \cdot 3H_2O$—0.075 mole
Triton X 100—0.5 g.
$SO_4^{=}:NO_3^{-}$—3.0 mole Copper films were deposited from the baths shown in Examples 3 and 4 in the same manner as in Example 1. The plated films failed to withstand heat cycling at 200° C. The films exhibit distortion, i.e., large internal stress, and as a consequence induced stress in the magnetic films. The magnetic properties of the magnetic films change drastically and were not reproducible. For example, $\alpha$ ranged from 6 to 12 and the coercivity ranged from 6 to 10, values which cannot be tolerated in commercial devices of the type disclosed.

It should be understood that the practice of the invention is not limited to the electro-deposition of copper for the particular application described above, but is also generally applicable to any electrolytic process where it is desired to produce copper films having high conductivity, of high ductility, of uniform thickness, low internal stress and which will not blister or peel on heating.

There has been described an improved copper plating bath having a $SO_4^{=}$ to $NO_3^{-}$ molar ratio from 0.52 to 1.9. Also described is a method of plating in which the plating bath is flowed over the area to be plated at a uniform velocity and with laminar agitation.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An aqueous electrolytic copper plating bath comprising a water soluble copper salt present to supply cupric ions in the range of from about 0.20 to about 0.36 mole/liter, sulfate ions present in the range of from about 0.21 to about 0.47 mole/liter, nitrate ions present in the range of from about 0.22 to about 0.52 mole/liter, formic acid present in the range of from about 0.21 to about 0.62 mole/liter and acetic acid present in the range of from about 0.10 to about 0.32 mole/liter, with the sulfate and nitrate ions being present in a molar ratio in the range of about 0.52 to about 1.90.

2. A method for depositing thick high conductivity films comprising the steps of:

(a) flowing an aqueous copper plating bath at a uniform velocity over an area to be plated, said plating bath comprising cupric ions in the range of about 0.20 to about 0.36 mole/liter, sulfate ions in the range of about 0.21 to about 0.47 mole/liter, nitrate ions in the range of from about 0.22 to about 0.52 mole/liter, formic acid in the range of from about 0.21 to about 0.62 mole/liter, and acetic acid in the range of from about 0.10 to about 0.32 mole/liter, with the sulfate and nitrate ions being present in a molar ratio of about 0.52 to about 1.90; and (b) laminarily agitating said bath while maintaining a current density across said bath at about 40 to 50 ma./cm.$^2$.

3. A bath according to claim 1 wherein said nitrate ions source and copper ion source is $Cu(NO_3)_2 \cdot 3H_2O$, said sulfate ion source is $H_2SO_4$.

4. A bath according to claim 1 wherein said nitrate ion source is $HNO_3$, said copper ion and said sulfate ion source is $CuSO_4 \cdot 5H_2O$.

References Cited

A. G. Gray: Modern Electroplating, pp. 231–243 (1953).

GERALD L. KAPLAN, Primary Examiner